United States Patent [19]

Young

[11] 4,165,810

[45] Aug. 28, 1979

[54] ROLLING-CARGO LOADING/UNLOADING RAMP HAVING A STOWABLE LIFT FOR PALLETIZED CARGO

[75] Inventor: Manley A. Young, Renton, Wash.

[73] Assignee: The Boeing Company, Seattle, Wash.

[21] Appl. No.: 859,431

[22] Filed: Dec. 12, 1977

[51] Int. Cl.² ............................................. B65G 47/00
[52] U.S. Cl. ........................................ 414/595; 187/10; 414/545; 414/537; 244/118 R; 244/137 R
[58] Field of Search ............... 214/84, 85, 85.1, 83.26, 214/100, 103, 660, 75 H, 75 T, 75 G; 187/10, 12; 244/118 R, 137 R

[56] References Cited

U.S. PATENT DOCUMENTS

| | | | |
|---|---|---|---|
| 298,933 | 5/1884 | Barcus | 187/10 |
| 1,321,780 | 11/1919 | Anderson | 187/10 |
| 2,735,558 | 2/1956 | Chesher | 214/103 |
| 3,002,719 | 10/1961 | Weiland et al. | 244/118 R |
| 3,211,307 | 10/1965 | Neaverson et al. | 187/10 |
| 3,478,904 | 11/1969 | Courter | 244/137 R |
| 3,861,542 | 1/1975 | Molten et al. | 244/137 R |
| 3,885,685 | 5/1975 | Montgomery et al. | 244/137 R |
| 3,944,087 | 3/1976 | Molter et al. | 244/137 R |
| 3,972,427 | 8/1976 | Stanley et al. | 244/137 R |
| 4,046,226 | 9/1977 | Flinchbaugh | 187/12 |

*Primary Examiner*—Lawrence J. Oresky
*Attorney, Agent, or Firm*—Christensen, O'Connor, Johnson & Kindness

[57] ABSTRACT

An inclined ramp, for loading and unloading rolling cargo between ground level and a cargo bay of an air transport, incorporates a stowable lift for handling palletized cargo which is deployable into an operative position providing a horizontal pallet receiving platform and which is retractable into a collapsed, stowed position nested in an elongate recess between treadways of the ramp. The platform of the lift is supportively mounted on a carriage which rides up and down the ramp on tracks mounted within the recess. The rolling-cargo ramp, with the pallet lift stowed therein, is retractable into the cargo bay for on-board transit and is deployable from the cargo bay for use at airfields where specialized, ground-based cargo-handling equipment is unavailable and when a mix of both rolling and palletized cargo is involved.

13 Claims, 8 Drawing Figures

ROLLING-CARGO LOADING/UNLOADING RAMP HAVING A STOWABLE LIFT FOR PALLETIZED CARGO

BACKGROUND OF THE INVENTION

The invention pertains to cargo handling ramps suitable for loading and unloading various kinds of cargo between ground level and an elevated cargo bay of a transport, such as that of an aircraft.

As disclosed in U.S. application Ser. No. 673,917, filed on Apr. 5, 1976, now U.S. Pat. No. 4,039,163, issued Aug. 2, 1977, by Thomas H. Shorey for AIRCRAFT CARGO RAMP, it is many times necessary to load and unload air transported cargo between a cargo bay of the aircraft and ground level, without the assistance of special, ground-based cargo-handling equipment of the type available at larger air terminals. For example, emergency or temporary airstrips may not be equipped with such specialized ground-based equipment. To fulfill this need, cargo loading/unloading ramps have been developed, wherein such ramps are carried on board the aircraft, within the cargo bay and are deployed prior to loading or unloading so as to extend at an incline between ground level and the threshold of the cargo bay opening. The configuration of ramps of this type is such that rolling cargo, i.e., wheeled and endless belt driven vehicles, can be moved up and down the ramp and thus quickly loaded and unloaded.

In the rolling-cargo ramp disclosed in the above-mentioned application, the ramp is fitted with retractable roller and pallet guide assemblies for converting ramp treadways into inclined roller conveyers for loading and unloading palletized cargo. In this manner, the ramp structure provides the capability of handling a variety of cargo types, in particular a mix of both rolling and palletized cargo.

While the conversion of the treadways to roller conveyors has been found satisfactory for handling small pallets, boxes and the like, the loading and unloading operations are slow and tedious, especially where boxes or small pallets of cargo must be taken from a stack and loaded in a single file fashion on the treadway conveyors, and thereafter removed and individually restacked. Also, to load the cargo, each of the boxes and small pallets must be either manually pushed up the ramp or pulled by a winch, the latter requiring means for somehow attaching the winch cable to the individual boxes and pallets. During unloading, fragile cargo must be lowered slowly or caught as it is slid by gravity down the ramp conveyors.

Similar difficulty is encountered in attempting to load and unload palletized cargo of the type that cannot be unpackaged and moved box by box. For example, heavy machinery is often transported by strapping it to large pallets which are ideally transported and handled as a palletized unit. Such palletize equipment may be too large and heavy to be readily placed on the roller conveyors and lowered or raised along the inclined ramp.

Another disadvantage of the inclined roller conveyors is that the cargo must be tilted to match the incline of the ramp each time it is moved onto the ramp, either from the cargo bay of the aircraft, or from the flat bed of a truck. For small and lightweight cargo this is usually not difficult, however, for large and heavy items, the tilting and relevelling of the cargo each time it is moved on and off the ramp, requires additional time and involves added risk to the safety of the cargo and to the cargo handling crew.

Accordingly, it is an object of the invention to provide an improved, rolling-cargo ramp apparatus of the type that is convertible to a configuration for handling palletized cargo, and which when in the latter configuration is capable of faster, more efficient and safer handling of palletized cargo.

Another object of the invention is to provide such a convertible ramp appparatus which in its pallet handling configuration is capable of loading and unloading relatively large, bulky and/or heavy palletized cargo, such as stacks of boxes carried on a single, large pallet, and heavy machinery or the like strapped to a large pallet.

A further object of the invention is to provide such a convertible ramp apparatus, which in its pallet handling configuration permits the palletized cargo to remain level while being loaded and unloaded. A related object is to provide such a convertible ramp apparatus in which the palletized cargo can be transferred to the pallet handling ramp apparatus from the bed of a truck transport, or from the floor of an aircraft cargo bay while continuously supporting the palletized cargo in a level orientation.

Additionally, it is an object of the invention to provide a convertible ramp apparatus for loading and unloading a mix of rolling and palletized cargo to and from an aircraft cargo bay which is capable of handling a wide variety of pallet sizes, including relatively large pallets, and is capable of accommodating relatively heavy palletized cargo such as large machinery, and which is of a lightweight construction and is collapsible into a relatively small compact assembly suitable for being carried on board the aircraft for use in handling cargo at temporary and emergency airfields where specialized, groundbased cargo handling equipment is unavailable.

It is also an object of the invention to provide such a convertible ramp apparatus that is rugged, reliable, lightweight, adaptable to a wide range of pallet sizes, and is quickly and easily extended into an operative position for loading and unloading and is similarly returned to its stowed position within the cargo bay for flight.

SUMMARY OF THE INVENTION

To achieve these objectives and advantages, an integrated pallet lift and rolling-cargo ramp apparatus is provided in which the pallet lift is deployable into a configuration that presents a horizontal pallet receiving platform supported on a track guided carriage that is moved up and down the inclined ramp by a winch. The apparatus is quickly converted to handle rolling cargo by retracting the pallet lift from its deployed configuration into a stowed position in which the lift platform is collapsed into a compact configuration and is retracted into a recessed position nested between the treadways of the ramp.

Preferably, the pallet supporting platform is formed by a support beam disposed in lengthwise alignment with the ramp, centrally of the recess, and a pair of elongate outboard support members that are disposed parallel to the beam and are supportively connected thereto by a plurality of outrigger arms that have their inner ends pivotally connected to the sides of the beam.

The center beam is in turn supportively mounted on the carriage by support linkage that is articulatable between positions in which the beam is deployed to a horizontal orientation projecting outwardly from the recess of the inclined ramp, and in which the beam is retracted into a position parallel to the inclined ramp and nested within the recess between the treadways. Following the deployment of the center beam to its horizontal position, the outrigger arms are swung outwardly to dispose the outboard support members in laterally spaced relation to the beam thereby providing a horizontal, pallet supporting platform. Conversely, during retraction, the outrigger arms are swung inwardly about their inner ends, folding the arms along side the center beam and thereby drawing the outboard support members into close juxtaposition with the beam. The platform is thus collapsed sufficiently so that the outrigger arms and outboard support members can be retracted into a nested position, along with the center beam, in the recess of the ramp.

Power means are preferably provided for articulating the support linkage to deploy and retract the center beam, and for swinging the outrigger arms between their outwardly extended and inwardly folded positions. And the support linkage for the center beam is preferably configured so that the level of the beam and platform when deployed can be adjusted to match the levels of the cargo bay and the bed of a ground transport vehicle.

To bear the heavy loads that may be placed on the lift platform, the lift carriage is preferably composed of two end-to-end coupled carriage segments, each segment having front and rear sets of wheels held captive within the carriage tracks, and the above-mentioned support linkage is so configured that approximately equal portions of the total platform load are separately borne by the two carriage segments.

It is also preferable that the stowable pallet lift be sized and arranged for stowage within one segment of a multisegment, end-to-end hinged ramp apparatus of the character disclosed in the above-mentioned U.S. Pat. No. 4,035,163. When the pallet lift is so positioned within one ramp segment, the ramp can be foldably retracted into the cargo bay, thereby providing a space saving configuration during flight. When needed for loading and unloading, the ramp apparatus is quickly and easily withdrawn from the cargo bay, unfolded into its entended configuration for use either as a rolling-cargo ramp, in which case the pallet lift is retained in its stowed position, or as a pallet handling mechanism, in which case the pallet lift is deployed.

To provide a complete disclosure of the invention, reference is made to the appended drawings and the following description of one particular and preferred embodiment.

DESCRIPTION OF THE PREFERRED EMBODIMENT

Figures 1, 2:
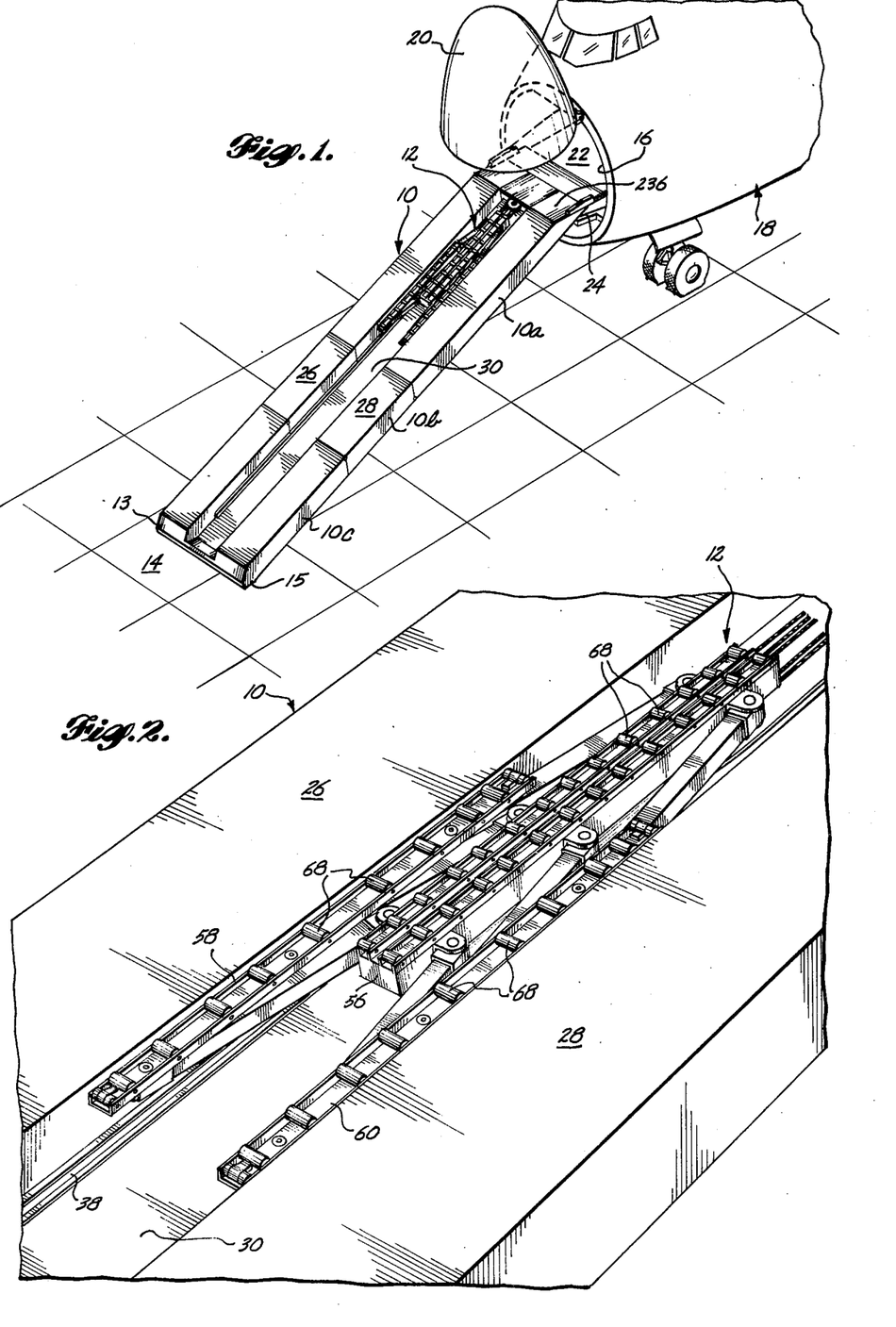
FIG. 1 is perspective view illustrating the rolling-cargo ramp and the integrated, stowable, pallet lift of the invention (in its stowed position) for loading and unloading rolling cargo to and from a cargo bay of an air transport.
FIG. 2 is an enlarged fragmentary view of FIG. 1, showing the stowed pallet lift in greater detail.

With reference to FIG. 1, the invention comprises an integrated, rolling-cargo ramp 10 and stowable pallet lift 12, illustrated in the environment of an apparatus for loading and unloading cargo between ground 14 and a forward cargo opening 16 of an aircraft 18. In this embodiment, opening 16 is provided by an upwardly swingable nose section 20 of the aircraft which in the position illustrated in FIG. 1 provides access to an interior cargo bay 22 of a size sufficient to accommodate rolling cargo including vehicles of all types. Preferably, ramp 10 is of the type comprised of a plurality of end-to-end hinged ramp segments 10a, 10b and 10c and is retractable into bay 22 by folding the ramp segments into a compact configuration for on-board stowage as more fully described in the above-mentioned application, U.S. Pat. No. 4,039,163. For loading and unloading, the folded segments of ramp 10 are withdrawn from bay 22 and unfolded to assume a straight ramp configuration as shown in FIG. 1, inclined between a toe end 13 that has a foot portion 15 supported on ground 14 and an upper end attached to a sill 24 of opening 16. When so deployed, segments 10a–10c of ramp 10 are structurally reinforced to support the rolling cargo which rides on spaced, parallel treadways 26 and 28, and which may be driven up and down ramp 10 under their own power or hauled up into and lowered from bay 22 by means of a power driven winch.

During use of ramp 10 for loading and unloading rolling cargo, lift 12 is disposed in its stowed position as depicted in FIGS. 1 and 2, where it assumes a collapsed, inclined configuration nested within an elongate recess 30 defined between treadways 26 and 28. From this stowed position, lift 12 is quickly and easily deployed to the configuration shown in FIG. 3 in which it provides a generally level, pallet supporting platform that rides up and down the ramp on a movable carriage for loading and unloading palletized cargo.

Figure 3:
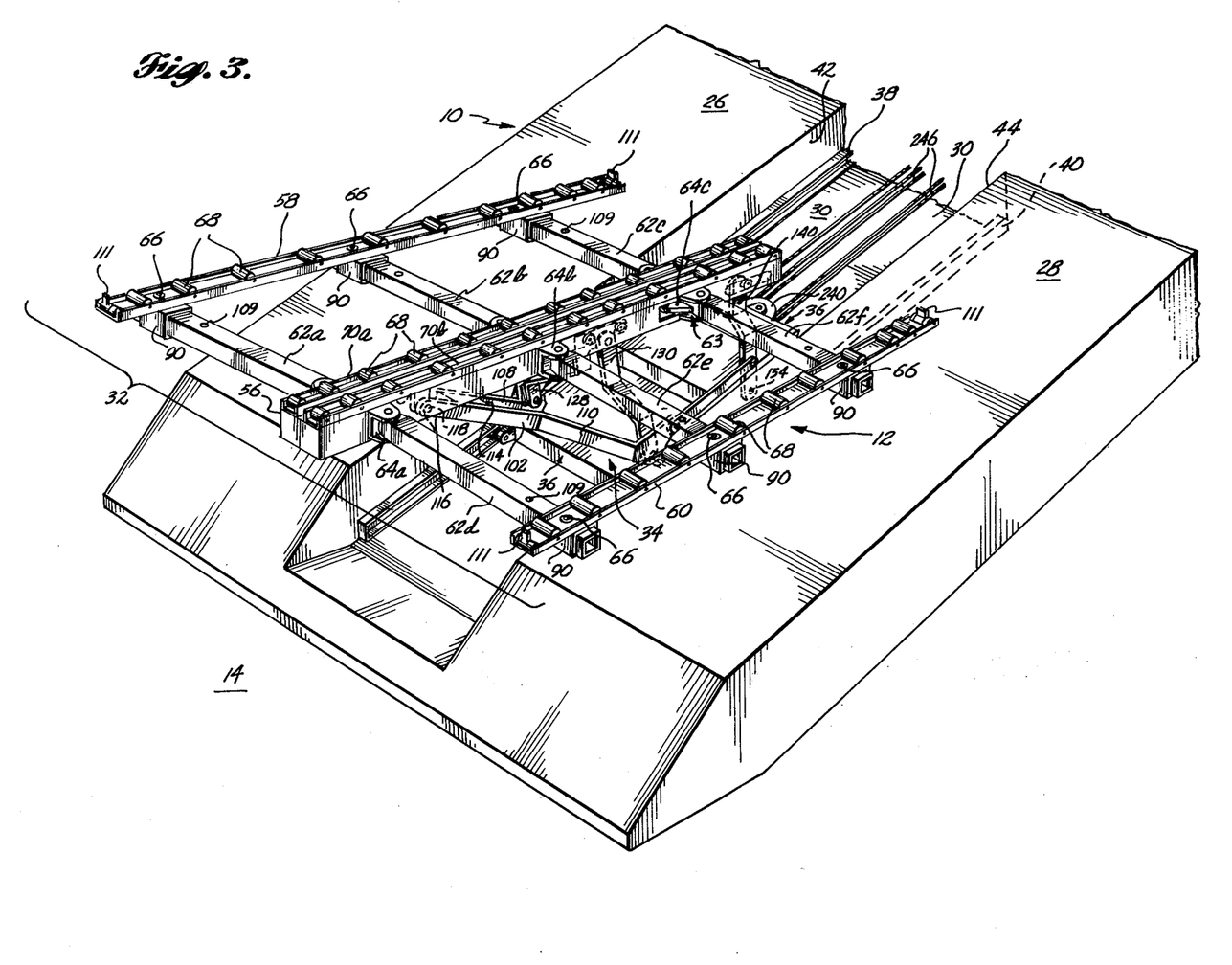
FIG. 3 is an enlarged view of the ramp apparatus of FIG. 1, however, here showing the pallet lift in its deployed position for loading and unloading palletized cargo.

With particular reference to FIG. 3, lift 12 comprises a retractable/deployable platform assembly 32, beam retract/deploy and support linkage assembly 34 for supporting platform assembly 32 on a carriage 36, which in turn rides on a pair of spaced parallel carriage tracks 38, 40, respectively mounted along the inwardly facing sidewalls 42, 44 of recess 30. Additionally, lift 12 includes an outrigger retract/deploy assembly 63 which functions together with linkage assembly 34 to deploy and retract platform assembly 32.

Figure 4:
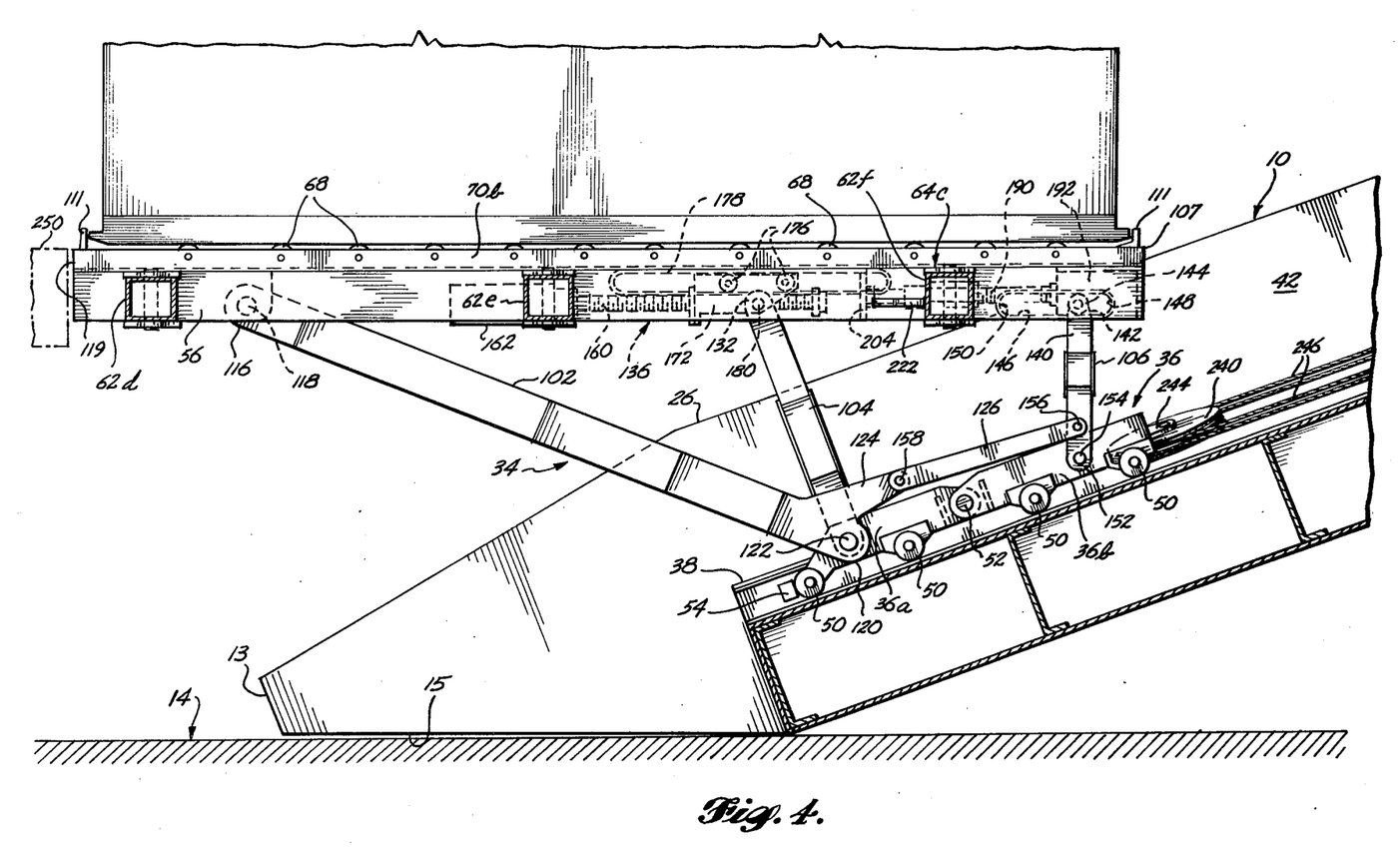
FIG. 4 is a side elevational view of the deployed pallet lift with the near side treadway of the ramp removed to show the carriage and one of the carriage tracks of the pallet lift.

With reference to FIG. 4, carriage 36 includes a pair of end-to-end coupled carriage segments 36a and 36b, each segment having a separate set of four wheels 50 arranged with one pair of fore/aft spaced wheels on one side of the associated carriage segment for riding on track 38 and another pair of fore/aft spaced wheels on the opposite side of the carriage segment for cooperating with the other track 40. Tracks 38 and 40 are channel shaped and are mounted on sidewalls 42 and 44, spaced inwardly with respect to the plane of treadways 26 and 28 and with the openings of the channels facing inwardly. Wheels 50 of carriage 36 are held captive between the inwardly projecting flanges of the channel shaped tracks 38, 40 to constrain the movement of each of carriage segments 36a and 36b to a path that is parallel to tracks 38, 40 and thus parallel to ramp 10. Stops are provided at each end of tracks 38, 40 as indicated by the lower end stop 54 of track 38, to establish travel limits of carriage 36 at the lower and upper ends of the ramp. Tracks 38 and 40 are permanently affixed to the ramp and are severed at the joints between ramp segments 10a, 10b and 10c so as to be compatible with the foldable construction of the ramp.

Carriage segments 36a and 36b are coupled by a pivot pin 52 that extends transversely and horizontally so as to allow independent pivoting of the carriage segments about a transverse and horizontal axis. In this manner each segment of the carriage self-adjusts to support its share of the total weight on the lift platform, causing the load to be distributed equally among each set of four wheels 50.

Figure 5:
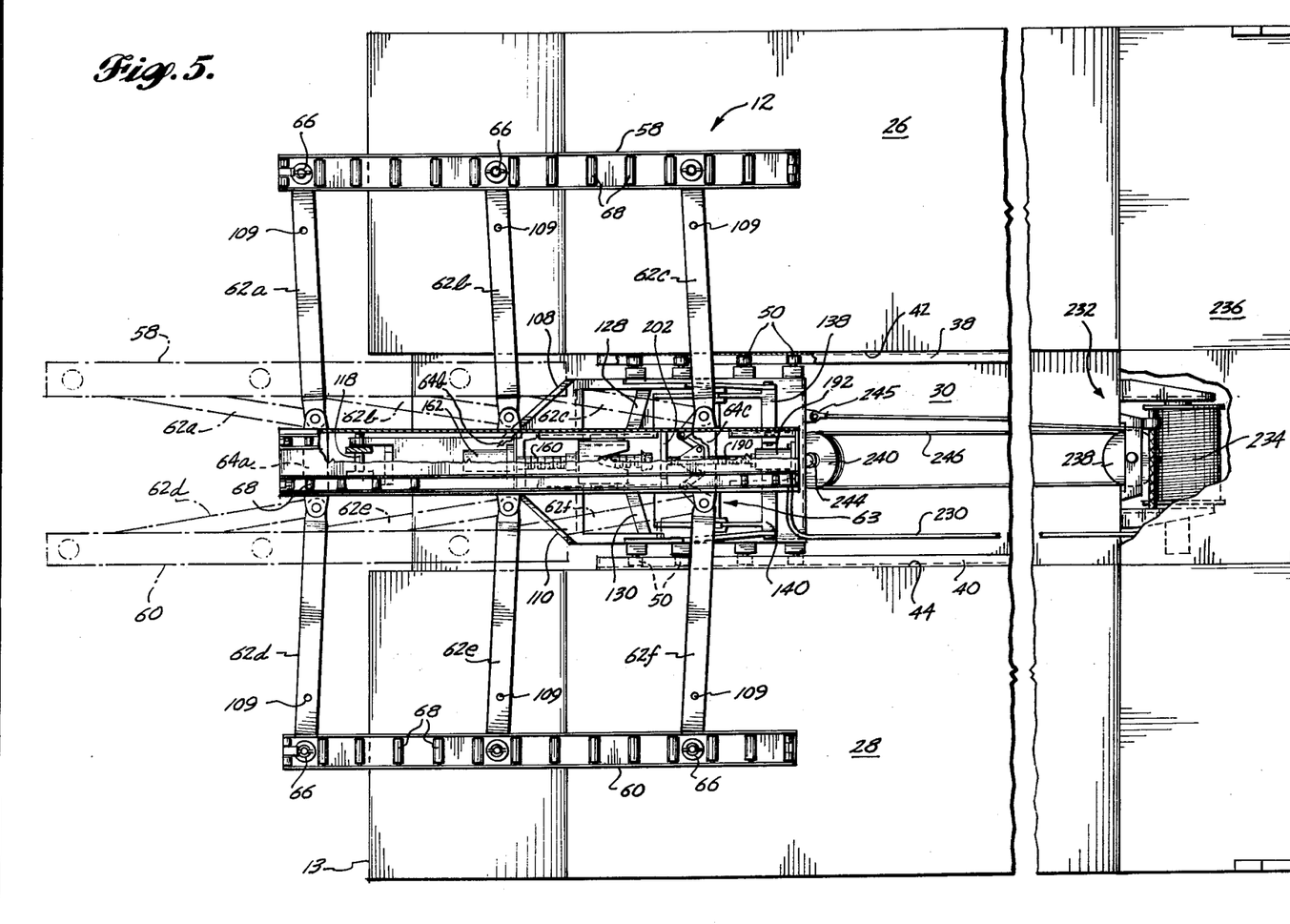
FIG. 5 is a plan view of the ramp and pallet lift apparatus of FIG. 3 in which a pallet supporting platform of the lift is shown both in the deployed configuration (by the solid lines) and in the collapsed configuration (by the broken lines).

With reference to FIG. 3, platform assembly 32 is formed by a center beam 56 oriented in lengthwise alignment with the center of recess 30, and a pair of elongate, outboard pallet supporting members 58 and 60 that are supported on the outer ends of a plurality of outrigger arms 62a-f. The inner ends of arms 62a-f are hingedly and supportively attached to center beam 56 along opposite sides thereof by a plurality of bilateral hinge assemblies 64a-c, each of which as more fully described herein, includes a hinge support bracket mounted crosswise with respect to beam 56 and configured at its opposed ends for hingedly supporting laterally opposed pairs of outrigger arms 62a, 62d and 62b, 62e and 62c, 62f. The hinged mounting of each of arms 62a-f is about vertical axes (when beam 56 is horizontal) permits the outrigger arms to be swung in a horizontal plane between positions extending outwardly from beam 56 as shown in FIG. 3 and FIG. 5 (solid lines) to positions folded forwardly along opposite sides of beam 56 as shown by the stowed position of the lift in FIG. 2 and as depicted by the dotted line position in FIG. 5. Outboard support members 58 and 60 are supportively connected to the outer ends of outrigger arms 62a-f by swivel joints 66 which as described more fully herein in conjunction with FIG. 8, have vertically oriented rotational axes that allow relative rotation between arms 62a-f and members 58, 60.

Pallet supporting rollers 68 are provided on outboard members 58, 60 and on center beam 56 so that pallets can be slid onto and off of platform assembly 32 with minimal effort. Preferably rollers 68 are uniformly oriented for slidably receiving and removing the pallets in the fore/aft directions aligned with the lengthwise dimension of beam 56 and members 58 and 60. For beam 56, rollers 68 are rotatably mounted in roller trays 70a and 70b arranged lengthwise and in proximate, side-by-side relation on the upper surface of beam 56. The outboard rollers 68, are mounted directly on outboard members 58 and 60 which are fabricated of a suitable structural metal and are of a suitable shape and size to serve both as the support members 58, 60 and as roller support trays.

Figure 6:
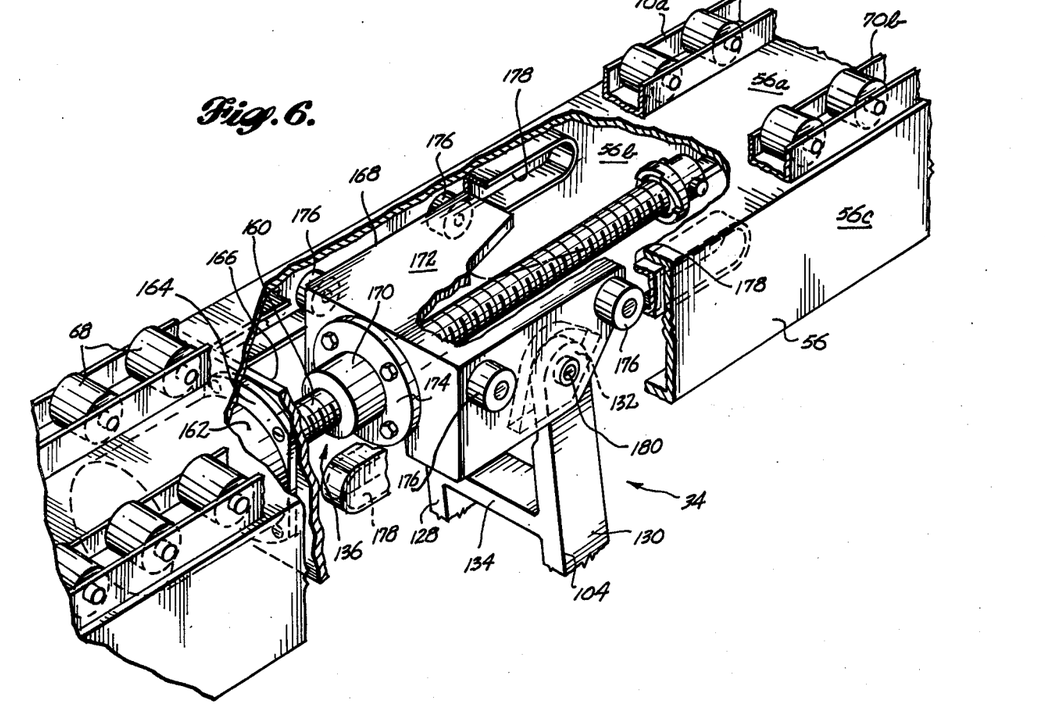
FIG. 6, is a detail view, in isometric, of a power driven screw actuator mechanism used to deploy and retract the pallet lift of FIG. 1, in which certain parts of the mechanism and its supporting structure have been broken away for clarity.

With reference to FIG. 6, beam 56 is made of a structural metal, and has the shape of an inverted channel formed by a back 56a and flanges 56b and 56c. Back 56a is disposed in a generally horizontal plane when the platform assembly 32 is deployed and forms the supporting surface for roller trays 70a and 70b. Flanges 56b and 56c of beam 56 depend vertically downwardly from back 56c and thereby form a protected interior region, accessible from beneath the beam, which serves as a housing for certain pivot joints and actuating devices of the retract/deploy assemblies 34 and 63.

Figure 7:
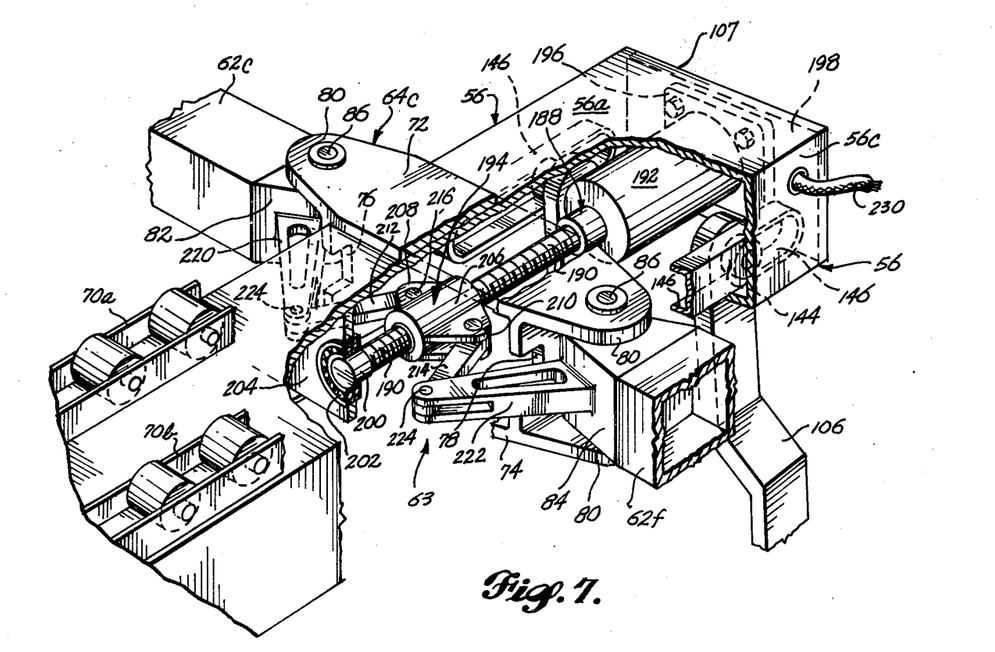
FIG. 7 is also a detail view, in isometric, showing another power driven screw actuator mechanism which is also used to deploy and retract the pallet lift, and in which certain of its parts and supporting structure have been broken away to show the details of the mechanism.

Along beam 56, hinge brackets 64a-c are mounted at longitudinally spaced intervals as shown in FIG. 5. Each of these brackets, as shown by bracket 64c in FIG. 7, is formed by upper and lower horizontally oriented bar members 72 and 74 disposed crosswise with respect to beam 56, and connected together by laterally spaced vertical connecting members 76 and 78 extending along the outside surface of beam flanges 56b and 56c. Members 76 and 78 are split along a horizontal plane midway between members 72 and 74 for assembly purposes, and the back 56a of beam 56 is notched to the width of upper member 72 so that bracket 64c is attached to the beam in the following manner. An upper section of the bracket including bar member 72 and the downwardly depending upper half segments of connecting members 76 and 78 is positioned to straddle the back 56a of beam 56, and a lower section including bar member 74 and the upwardly projecting lower half segments of members 76 and 78 are brought into position from beneath beam 56 so as to cause the split ends of connecting members 76 and 78 to abut midway of beam flanges 56b and 56c. Member 72 is seated in the notch provided in back 56a of beam 56 so that the upper surface of member 72 is flush with the upper surface of back 56a for receiving roller trays 70a and 70b. When thus assembled on beam 56, bracket 64c is welded in place.

The ends of bar members 72 and 74 are rounded and project laterally outwardly from flanges 56b and 56c to form vertically spaced, pairs of lugs 80. Vertically aligned holes are formed in each of the pairs of lugs 80 and an end fitting 82 of outrigger arm 62c and an end fitting 84 of the laterally opposed outrigger arm 62f are formed with vertically oriented bores. End fittings 82 and 84 are disposed between the associated pairs of lugs 80, and are hingedly secured in place by vertically extending hinge pins 86.

The configuration and mounting of each of the other hinge support brackets 64a and 64b and their cooperation with outrigger arms 62a, 62d and 62b, 62e are substantially identical to that depicted by bracket 64c and arms 62c, 62f in FIG. 7 with the following exception. The end fittings 82 and 84 of outrigger arms 62c and 62f are formed with crank portions 220 and 223 respectively, which as described more fully herein, cooperate with a power driven screw actuator assembly to move the outrigger arms between their extended, deployed positions and their inwardly folded positions. Also, to accommodate the movement of crank portions 220 and 222, bracket members 76 and 78 are formed with notches at 77 and 79, respectively.

Referring again to FIG. 3, outrigger arms 62a–62f are made of structural metal and are tubular with a square cross section, a configuration which provides adequate load bearing characteristics while being relatively lightweight. The inner, hinged ends of these tubular members are provided with solid fittings as shown by end fittings 82 and 84 for arms 62c and 62f in FIG. 7.

At the outboard ends of arms 62a–62f, outboard members 58 and 60 are mounted by a plurality of square section sleeves 90 (FIGS. 3 and 8), fitted to the exterior dimensions of arms 62a–62f. Sleeves 90 are slid over the outboard ends of the outrigger arms and are moved to preselected positions therealong and are locked in place by locking pins which form a part of each swivel joint 66 as shown for the sleeve 90 mounted on arm 62d in FIG. 8.

Figure 8:
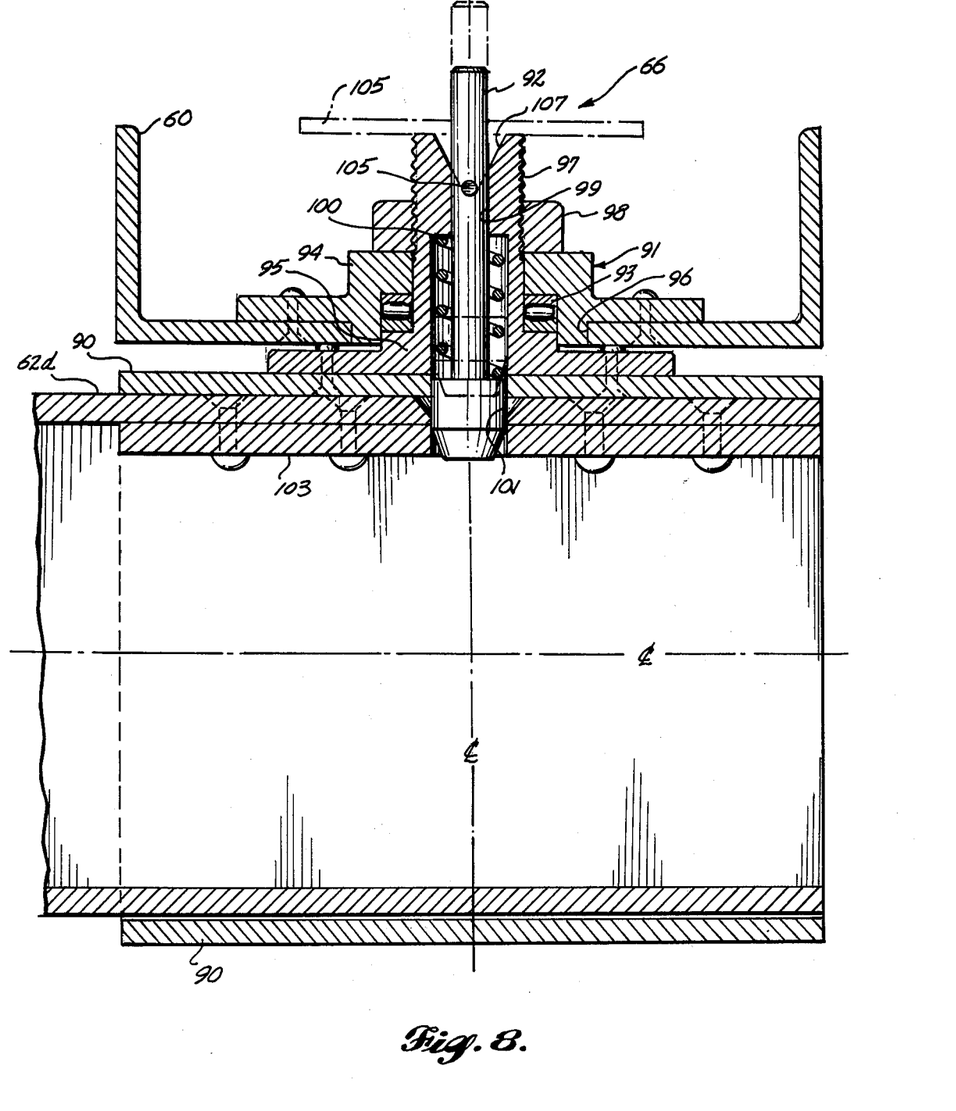
FIG. 8 is a vertical sectional view of a swivel connection used in the pallet supporting platform of the lift.

Swivel joint 66 is shown in FIG. 8 to include a thrust bearing assembly 91 mounted between the sleeve 90 and outboard member 60 and having a central, vertical bore which accommodates a locking pin 92. Assembly 91 is formed by a thrust bearing 93 of a generally cylindrical shape fitted between separable bearing housing sections 94 and 95, each of annular shape, and each having a mounting flange. A circular opening 96 is provided in member 60 to receive housing sections 94 and 95 which are coaxially arranged with respect thereto such that section 95 is supported on and affixed to an upper surface of sleeve 90 and projects upwardly therefrom through opening 96. Bearing 93 and housing section 94 are slipped over the upwardly projecting end portion 97 of housing section 95, so that bearing 93 is held captive between housing sections 94 and 95, and the mounting flange of housing section 94 is affixed to the upper horizontal surface of member 96. The upper end portion 97 of housing section 95 is threaded for accommodating a lock nut 98 which limits the upward displacement of housing section 94 and thus holds housing section 94, member 60 and bearing 93 in place on housing section 95.

A central countersunk bore 99 is provided in housing section 95 wherein bore 99 is continued downwardly through sleeve 90. Pin 92 and a biasing spring 100 are arranged in the larger diameter portion of bore 99 for biasing pin 92 so as to cause a lower end of the pin to normally reside in a registering detent 101. To form detent 101, aligned holes are provided in the upper horizontal portion of square tubular arm 62d and in a reinforcing plate 103 which is riveted to the underside of such portion of arm 62d. Withdrawal of pin 92 from detent 101 to permit sleeve 90 to be moved along arm 62d is accomplished by means of an elongate handle 105 transversely affixed to pin 92 adjacent its upper end such that handle 105 may be grasped and raised up out of downwardly convergent V-shaped detents 107 formed in the upper end portion 97 of housing section 95 and turned crosswise with respect to member 60 as shown by the dotted line position of handle 105 in FIG. 8. In this position handle 105 can be released to rest on the upper end of housing section 95 so as to hold the pin 92 out of engagement with detent 101. To reset pin 92 in detent 101, or in another similarly formed detent 109 provided on arm 62d inboard of detent 101 such as shown in FIG. 5, handle 105 is rotated into lengthwise alignment with member 60, and thus into alignment with notches 107.

Retractable pallet restraints 111 are mounted at the opposite ends of each of outboard members 58 and 60 and are movable between retracted positions lying below the plane of the upper pallet supporting surfaces of rollers 68 and extended positions projecting above such plane for contact with and restraint of the edges of a pallet placed on platform assembly 32. Each restraint 111 is provided with a latch for releasably locking it in its extended, pallet restraining position.

The retract-deploy system for platform assembly 32 includes the previously mentioned beam retract/deploy and support linkage assembly 34 (see FIGS. 3, 4 and 6), and the outrigger retract/deploy and linkage assembly 63 (see FIGS. 3, 5 and 7). Assemblies 34 and 63 operate in a sequential fashion during deployment to raise and level beam 56 and thereafter deploy outboard members 58 and 60 by means of outward and rearward rotation of outrigger arms 62a–62f. The operating sequence is reversed during retraction of assembly 32 in which outboard members 58 and 60 are first swung inwardly and forwardly against beam 56 and thereafter beam 56 is lowered into recess 30.

With reference to FIG. 4, beam retract/deploy and support linkage assembly 34 includes a forward support link 102, a middle support and actuator link 104, and a rear support and camming link 106 positioned adjacent a rear end 107 of beam 56. Link 102 is a rigid sructure formed by a pair of elongate bars 108 and 110 (FIG. 5) which are held in spaced, parallel relation adjacent a first end 116 of link 102 by cross connecting members 114 (FIG. 3). The separation of bars 108 and 110 by members 114 is such that the bars at end 116 fit just inside of the downwardly projecting flanges 56b and 56c of beam 56, where bars 108 and 110 are pivotally connected to beam 56 by transversely extending pivot pins 118 adjacent its forward end 119. At the opposite end 120 of link 102, bars 108 and 110 are bent so as to first diverge outwardly and then extend in parallel relation to form a yoke that straddles carriage segment 36a. The yoked end 120 of link 102 is connected to carriage segment 36a by transversely disposed pivot pins 122 that join the ends of bars 108 and 110 to the sides of carriage segment 36a. Each of bars 108 and 110 at yoked end 120 is formed with a bell crank portion 124 that projects generally upwardly and rearwardly from end 120. Crank portions 124 are connected by reaction links 126 to corresponding bars of a similar yoke structure provided on one end of rear link 106 as described more fully below. The yoked construction of link 102 at end 120 enhances the lateral stability of beam 56, as does the spacing of bars 108 and 110 adjacent the end 116 of the link.

Middle support and actuating link 104 is formed of a pair of spaced bars 128 and 130 (FIGS. 3 and 5) shaped and secured together in a similar fashion to link 102, but shorter and slighter than link 102. At an upper end 132 of link 104 as shown in FIG. 6 bars 128 and 130 are held in spaced parallel relation by one or more cross connecting members 134 such that bars 128 and 130 fit just inside of beam flanges 56b and 56c. Thereat bars 128 and 130 are pivotally connected to a screw follower asembly of a screw actuator 136, which as described more fully below, cooperates with link 104 to raise and lower beam 56 with respect to ramp recess 30. Adjacent the lower end of link 104, bars 128 and 130 are bent to form a yoke structure similar to that of link 102 (FIGS. 3 and 5) which straddles carriage segment 36a. Thereat, bars 128 and 130 are disposed inboard of bars 108 and 110 of link 102 and are connected to carriage segment 36a by the same pivot pins 122 that pivotally join link 102 to segment 36a. Thus the lower ends of links 102 and 104 rotate about a common transverse axis.

Link 106 of assembly 34 (FIG. 4) is likewise formed of a pair of spaced structural bars 138 and 140 (FIG. 5) and is shaped in a similar fashion to links 102 and 104, but is shorter and slighter. At the end 142 of link 106 (FIG. 4) the spaced parallel bars 138 and 140 (only one of which is visible in FIG. 4) fit just inside of beam flanges 56b and 56c and are equipped with rollers 144 that are held captive within elongate tracks 146 which extend lengthwise on beam 56. Tracks 146 are formed by inwardly confronting channel structures mounted on flanges 56b and 56c, and have rear stops 148 adjacent the rear end 107 of beam 56 and forward stops 150 adjacent the rearmost hinge support bracket 64c. Thus the upper end of link 106 is free to pivot with respect to beam 56 about the axes of roller 144, and is free to move lengthwise of beam 56 as rollers 144 travel between the forward and rear stops 150 and 148 of tracks 146.

Bars 138 and 140 are shaped adjacent the lower end 152 of link 106 to form a yoke structure similar to that of the yoked portions of links 102 and 104, and bars 138 and 140 are disposed thereat to straddle carriage segment 36b and to be pivotally connected to the outer sidewalls of carriage segment 36b by transversely disposed pivot pins 154.

The rearward ends of links 126 are connected by pivot pins 156 to bars 138 and 140 (FIG. 4) adjacent the lower end 152 of link 106 and intermediate pivot pins 154 and rollers 144. The forward ends of links 126 are connected by pivots pins 158 to the rearwardly projecting ends of bell crank portions 124 of link 102 such that the rotational position of link 106 is determined by the rotational position of link 102.

With reference to FIG. 6, screw actuator 136 serves to raise and lower beam 56 with respect to ramp recess 30 by driving the upper, pivotally connected end 132 of middle link 104, forwardly and rearwardly along a path of travel that extends lengthwise of beam 56. In particular, actuator 136 includes a rotatable lead screw 160 which is disposed lengthwise of beam 56 between flanges 56b and 56c and which is turned by an electric motor 162 that is mounted in place by fastening a mounting flange 164 to a transversely oriented mounting plate 166 affixed to beam 56 between flanges 56b and 56c. Cooperating with lead screw 160 is a screw follower assembly 168 including a nut 170 and a pivot support shoe 172 to which the ends 132 of link 104 are pivotally connected. Nut 170 has internal threads that cooperate with lead screw 160 and has an annular flange 174 that is bolted to shoe 172.

Shoe 172 is guided fore and aft on beam 56 by means of two pairs of rollers 176 which are spaced apart in the fore/aft direction and are held captive within tracks 178 that extend lengthwise of beam 56. Tracks 178 are formed by inwardly confronting channel structures mounted on the inside surfaces of beam flanges 56b and 56c and have stops at their forward and rear ends to limit the forward and rearward longitudinal travel of shoe 172. Shoe 172 is thus constrained to travel in a lengthwise path along beam 56 as lead screw 160 is turned by motor 162.

End 132 of link 104 is pivotally connected to shoe 172 by pins 180 pivotally joining the associated ends of bars 128 and 130 thereto so that shoe 172 serves as a movable pivot support for the upper end of link 104 which can be moved forward and rearwardly with respect to beam 56 along tracks 178. When shoe 172 is moved to a forward position along tracks 178, middle link 104 is caused to rotate in a counterclockwise fashion about pivot pins 122 (as seen in FIG. 4) causing the upper end 132 of the link to be displaced in a forwardly and downwardly extending arc, thereby lowering the front end 119 of beam 56. Conversely, when shoe 172 is driven rearwardly by lead screw 160, link 104 is rotated clockwise about pivot pins 122 (again as seen in FIG. 4) forcing the links upper end 132 to move in an upward and rearward arc, the vertical component of which raises beam 156 to the generally horizontal position in which it is shown in FIG. 4. Tracks 178 are of sufficient length such that shoe 172 can be moved and held in any desired position along the length of tracks 178 so that the angle between beam 56 (when deployed) and ramp 26, is adjustable, permitting the platform assembly to be brought to a level orientation even though the angle that ramp 26 makes with ground 14 may vary from site to site, and permitting the inclination of the platform to be slightly offset from a true horizontal orientation to match a slightly non-horizontal truck bed or cargo bay.

With reference to FIG. 7, outrigger retract/deploy assembly 63 includes a screw actuator 188, similar to actuator 136. Actuator 188 thus has a lead screw 190 disposed in lengthwise alignment with beam 56 between flanges 56b and 56c, a motor 192 mounted between flanges 56b and 56c for turning screw 190, and a screw follower assembly 194 that cooperates between lead screw 190 and the rearmost pair or outrigger arms 62c and 62f. Motor 192 is disposed adjacent the rear end 107 of beam 56 and has a mounting flange 196 which is secured to a transversely disposed mounting plate 198 affixed to beam 56 between flanges 56b and 56c. Lead screw 190 projects forwardly from motor 192 and the forwardmost end 200 of lead screw 190 is journalled for rotation in a bearing 202 held by a transversely disposed bearing support plate 204 affixed to beam 56 between flanges 56b and 56c.

Follower assembly 194 is a double acting mechanism including a nut 206 that has laterally opposed split lugs 208 and 210. A pair of links 212 and 214 have their inner ends pivotally mounted in lugs 208 and 210, respectively, by vertically disposed pivot pins 216 for articulation of links 212 and 214 in a horizontal plane. The outer and opposite ends of links 212 and 214 are pivotally joined to yoked ends of crank arms 220 and 222 by vertically disposed pivot pins 224, wherein arms 220 and 222 are integrally formed with end fittings 82 and 84 of outrigger arm 62c and 62f. With outrigger arms 62c and 62f deployed outwardly and thus transversely to beam 56 as depicted in FIG. 7, follower assembly 194 is near the forward end of its travel and crank arms 220 and 22 are in positions in which they project inwardly and forwardly from fittings 82 and 84, respectively. As described more fully below, to retract the outrigger arms follower assembly 194 is driven rearwardly by the rotation of lead screw 190 so as to simultaneously pull crank arms 220 and 222 inwardly and rearwardly to swingably fold outrigger arms 62c and 62f forwardly and inwardly. Conversely, assembly 194 is driven forwardly to cause links 212 and 214 and crank arms 220 and 222 to deploy the outrigger arms.

It is observed that screw actuator 188 of assembly 63 acts directly on outrigger arms 62c and 62f to move them between their deployed and retracted positions, while the remaining pairs of outrigger arms 62a, 62d and 62b, 63e are slaved to outrigger arms 62c and 62f by outboard members 58, 60 and swivel joints 66. Deployment and retraction of outrigger arms 62c and 62f thus forces the slave outrigger arms 62a, 62b, 62e and 62d to swing in unison with arms 62c and 62f between the deployed and retracted positions.

With further reference to FIG. 5, motors 162 and 192 of actuators 136 and 188, respectively, are operated from a control panel (not shown) mounted in cargo bay 22, which is connected to the motors by a flexible, power and control cable 230 that extends from bay 22 through the hinged joint 24 of ramp 10 and thence along a bottom wall of recess 30 to lift 12 where it is fed to the motors of the screw actuators through an aperture in flange 56c of beam 56 adjacent its rear end 107 (FIG. 7). With lift 12 lowered to near the toe end 13 of ramp 10 as shown in FIG. 5, cable 230 is stretched out in a relatively straight line along the bottom of recess 30. When, however, lift 12 is raised to the upper end of ramp 10 adjacent compartment 22, flexible cable 230 forms a loop to take up the slack.

Lift 12 is raised and lowered along ramp 10 by a power driven winch assembly 232 including a drum 234 mounted beneath a level platform section 236 of ramp 10 for reeling and unreeling a cable 246. A double pulley 238 is rotatably mounted adjacent to drum 234, and a second double pulley 240 is rotatably mounted on the rear carriage segment 36b (FIG. 4) by a pulley shaft and shaft support bracket assembly 244. Cable 246 is wound on drum 234 and extends therefrom to carriage sigment 36b where it makes a first wrap around pulley 240. From there, cable 246 extends back to pulley 238 for a first wrap and thence to pulley 240 for a second wrap; thence to pulley 238 for a second wrap on it and finally back to carriage segment 36b where the free end of the cable is fastened to bracket 245 on segment 36b. The thusly arranged cable and pulleys form a block and tackle system combined with winch drum 234 that enables the use of a smaller diameter cable than would be possible using a single strand of cable between drum 234 and the carriage 36. The operation of winch assembly 232 is controlled by the previously mentioned control panel (not shown) that is mounted in cargo bay 22.

OPERATION

With reference to FIG. 1, an unloading operation is commenced by raising nose section 20 to open cargo bay 22 and withdrawing and unfolding ramp segments 10a, 10b and 10c from bay 22 and setting the ramp 10 in an inclined position with surface 15 at the toe end 13 resting on ground 14. After the rolling cargo is unloaded from bay 22 using ramp treadways 26 and 28, lift 12 is deployed for unloading the palletized cargo.

An operator within bay 22 activates the beam lifting screw actuator 136 by energizing motor 162 through cable 230 forcing the shoe 172 and thus the upper end 132 of link 104 to move rearwardly along tracks 178 on beam 56. Since beam 56 is constrained by forward support link 102 from moving forwardly with respect to carriage 36, the displacement of the upper end 132 forces link 104 to rotate and to swing end 132 upwardly and rearwardly with respect to carriage 36 forcing beam 56 to rise upwardly therewith. At the same time, rear link 106 holds down the rear end 107 of beam 56 (as described more fully below) thereby forcing the forward end 119 of beam 56 upwardly in reaction to the upward force on the midsection of beam 56 by link 104. As the beam's forward end 119 rises, the forward support link 102 rotates in a clockwise direction (as viewed in FIG. 4) about pivot pins 122 displacing the ends of crank arm portions 124 rearwardly. Connecting links 126 and rear link 106 react to the displacement of crank portions 124 of link 102 causing link 106 to rotate in a clockwise direction (as viewed in FIG. 4) about pivot pins 154, thereby displacing rollers 144, at the upper ends 142 of link 106, upwardly and rearwardly in tracks 146. The upward component of movement of rollers 144 cams the rear end 107 of beam 56 upwardly raising it out of recess 30 such that the pallet supporting rollers 68 on the beam are elevated above treadways 26 and 28. Link 106 continues to be displaced in this manner until it assumes a generally vertical orientation as seen in FIG. 4 and in this orientation, beam 56 assumes an approximately level disposition.

Next, the operator de-energizes motor 162 of actuator 136 and energizes motor 192 of the outrigger actuator 188 (FIGS. 5 and 7). Just prior to the actuation of motor 192, outrigger arms 62a–62f are folded forwardly and inwardly alongside beam 56 as shown by the dotted line positions of these members in FIG. 5 and follower nut 206 is displaced rearwardly along lead screw 190 to a position adjacent motor 192. When motor 192 is energized lead screw 190 is rotated to cause nut follower 206 to be driven forwardly along screw 190 as shown in FIG. 7 causing the double acting follower assembly 194 to force crank arms 220 and 222 forwardly and outwardly swinging the rear set of outrigger arms 62c and 62f outwardly to positions substantially transverse to beam 56 as shown by the solid line position in FIG. 5. Simultaneously, the other outrigger arms 62a, 62b, 62d and 62e swing outwardly to the deployed position in unison with arms 62c and 62f by virtue of the slaved connection between the outrigger arms. Platform assembly 32 as shown in FIG. 3 is now deployed and motor 192 of screw actuator 188 (FIG. 5) is de-energized. If desired, an electrical interlock may be provided in the control system that operates motors 162 and 192 to prevent inadvertent deployment of the outrigger arms while beam 56 is still nested within ramp recess 30, and conversely to prevent the retraction of beam 56 while the outrigger arms remain deployed.

Winch assembly 232 is now operated to pull carriage 36 upwardly along ramp 10 to bring platform assembly 32 to a coplanar relationship with the floor of cargo bay 22. The pallet restraints 111 at the rear ends of outboard members 58 and 60 are retracted and a cargo bearing pallet is slid and rolled onto platform assembly 32 and the forward and rear restraints 111 are latched in their extended positions.

Lift 12 is now lowered by winch assembly 232 toward toe end 13 and is stopped at a position that brings the upper level of platform assembly 32 into coplanar relation with the bed 250 of a ground transport vehicle as shown in FIG. 4. The forward pallet restraints 111 are retracted and the pallet is rolled off onto the bed 250 of the vehicle.

As mentioned above, screw actuator 136 may be used by the operator to adjust the inclination of beam 56 and thus that of platform assembly 32 to bring the platform into a coplanar relationship with either the bed of the ground transport vehicle or the floor of cargo bay 22. Frequently, the inclination vehicle bed will be different from that of the floor of bay 22, and it will be either desirable or necessary to readjust the inclination of platform assembly 32 each time it is moved from one to the other. The ease with which the level of the platform assembly 32 can be adjusted, greatly facilitates the lift assisted loading and unloading operations.

When there is a need to adjust the width of platform assembly 32 to accommodate a smaller pallet, outboard members 58 and 60 can be inwardly repositioned on arms 62a-f. To accomplish this adjustment, pins 92 (FIG. 8) of each swivel joint 66 are withdrawn by handles 105 and latched in the withdrawn position as described above. Now members 58 and 60 are slide inboard of arms 62a-f on sleeves 90, until pins 92 are in registration with the inboard detents 109 (FIG. 5) and at such position the handles 105 on the pins are rotated to drop down into notches 107 and lock pins 92 in detents 109.

The loading of palletized cargo into cargo bay 22 from a ground transport vehicle proceeds in the reverse sequence to that of the above described unloading operation.

To stow lift 12 and ramp 10, the operator first retracts the outrigger arms 62a-62f and outboard support members 58 and 60 by operating screw actuator 188 in the reverse fashion to that described above for deploying the platform. When arms 62a-62f and outboard support members 58 and 60 have been swung alongside of beam 56, screw actuator 136 is operated to drive end 132 of link 104 forwardly of beam 56 thereby lowering beam 56 and the juxtaposed outrigger arms and outboard support members down into the stowed position within recess 30 with the rollers 68 recessed below the plane of treadways 26 and 28.

Thereafter, winch assembly 232 is operated to move the stowed lift 12 along ramp 10 to a position in which the entire length of the stowed lift lies within the upper ramp segment 10a as shown in FIG. 1. With lift 12 in this position, the segments 10a, 10b and 10c of ramp 10 can be folded upon themselves and retracted into cargo bay 22 of the aircraft for onboard stowage of the entire ramp apparatus.

While only a particular embodiment of the invention has been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. A rolling-cargo, loading/unloading ramp apparatus having a stowable lift for palletized cargo, comprising:
   a ramp having elongate, spaced-parallel treadways defining a longitudinally extending recess therebetween, said ramp adapted to be disposed at an inclined orientation for loading and unloading rolling cargo via said treadways;
   a pallet lift including a carriage means, carriage track means, retractable/deployable pallet supporting platform means, and retracting/deploying means;
   said carriage track means disposed lengthwise on said ramp in juxtaposition with said recess and said carriage means being disposed within said recess and supportively mounted on said track means for movement along said ramp within said recess;
   said retracting/deploying means supporting said platform means on said carriage means and selectively moving said platform means between a stowed position and a deployed position with respect to said ramp, said platform means assuming a collapsed, elongated and inclined configuration nested lengthwise within said recess when moved to said stowed position, and assuming a laterally expanded, pallet supporting generally level platform configuration overlying said treadways and recess when moved to said deployed position;
   means for moving said carriage means along said track means.

2. The ramp apparatus of claim 1 wherein said platform means comprises a central beam that extends lengthwise with said recess and outrigger means swingably and supportively mounted on said central beam, said outrigger means being swingably movable to a laterally outwardly extended position with respect to said beam when said platform means is moved to said deployed position and being swingably movable to an inwardly folded, generally juxtaposed position with respect to said beam when said platform means is moved to said stowed position.

3. The ramp apparatus of claim 2, wherein said retracting/deploying means comprises movable linkage means connected between said carriage means and said central beam for moving said central beam between an inclined position nested lengthwise within said recess when said platform means is moved to said stowed position and for moving said beam to a generally level and downwardly projecting position with respect to said recess when said platform means is moved to said deployed position.

4. The ramp apparatus of claim 2, wherein said outrigger means comprises a plurality of outrigger arms having first ends hingedly mounted along opposite sides of said central beam about vertically oriented axes, and elongate, outboard pallet support members supportively mounted on said outrigger arms adjacent their second ends and being swivelably connected to said outrigger arms about vertical axes so that said outboard support members move in a parallel motion away from and toward the central beam as said outrigger arms are swung between their outwardly extending and inwardly folded positions.

5. The ramp apparatus of claim 1, wherein said carriage means comprises first and second segments that are arranged end-to-end and are flexibly coupled at their adjacent ends, and wherein each segment has a set of at least four longitudinally and laterally spaced apart rollers operatively associated with said track means, and wherein said retracting/deploying means includes means for supporting said platform means on said first and second carriage segments such that each said segment bears a portion of the total load carried by said platform means.

6. The ramp apparatus of claim 5, wherein said adjacent ends of said carriage segments are coupled by a pivot joint having a horizontal axis that extends transversely to said track means.

7. The ramp apparatus of claim 2, wherein said retracting/deploying means comprises a tilting/levelling screw actuator jackscrew means mounted on said central beam and linkage means connected between said carriage means and said screw actuator means for moving said central beam between said inclined, longitudinally nested position within said recess and said generally level position projecting outwardly from said recess.

8. The ramp apparatus of claim 3, wherein said retracting/deploying means further comprises outrigger deploying/retracting screw actuator means mounted on said central beam and connected to said outrigger means for moving said outrigger means between the laterally outwardly extended position and the inwardly folded position.

9. The ramp apparatus of claim 3, wherein pallet supporting roller means are disposed on said outboard support members and said central beam so that pallets can be rolled onto and off of said platform means.

10. The ramp apparatus of claim 2, wherein said retracting/deploying means comprises a first link having its opposite ends pivotally connected to said carriage means and a point on said central beam adjacent a first end of said beam, said pivotal connections being about horizontal axes extending transversely with respect to said beam and ramp;

a secnd link having a first end pivotally connected to said carriage means;

slider means mounted on said beam for sliding movement longitudinally of said beam intermediate its first and second ends, said second link having a second end, opposite its first end, said slider means, pivotally connected to said slider means, and means for moving said slider means between a first position in which said first and second links rotate to tilt said beam to said inclined position nested lengthwise within said recess and a second position in which said first and second links counter-rotate to deploy said beam in a generally level orientation projecting outwardly from said recess.

11. The ramp apparatus of claim 10, wherein said retracting/deploying means further comprises a third link having its opposite ends separately and pivotally connected to said carriage means and to said central beam adjacent its second end, means for permitting the pivotal connection between said third link and said central beam to move longitudinally along said beam, and said first link having a bell crank portion adjacent the end thereof that is connected to said carriage means, and a reaction link connected between said bell crank portion and said third link so that as said first link rotates during movement of said beam from said inclined, longitudinally nested position toward said generally level outwardly projecting position said third link is forced by said bell crank portion and said reaction link to a position that raises the second end of said beam upwardly out of the nested position within said recess.

12. The ramp apparatus of claim 1, wherein said means for moving said carriage means comprises a power winch mounted on said ramp apparatus adjacent one end thereof.

13. The ramp apparatus of claim 1 adapted to be mounted at one end to the body of an aircraft at the threshold of an opening to a cargo bay therewithin and wherein said ramp is comprised of a plurality of end-to-end hingedly linked ramp segments that are foldable into a retracted position for on board stowage and are foldable into an extended position inclined downwardly from the threshold of the cargo bay toward ground level, and said carriage means, platform means and said retracting/deploying means being sized and arranged so that when said platform means is in its stowed position said carriage means, platform means and said retracting/deploying means are movable as a unit on said track means to a position retained completely within the recess of a single one of said ramp segments.

* * * * *

UNITED STATES PATENT AND TRADEMARK OFFICE
CERTIFICATE OF CORRECTION

PATENT NO. : 4,165,810

DATED : August 28, 1979

INVENTOR(S) : Manley A. Young

It is certified that error appears in the above-identified patent and that said Letters Patent are hereby corrected as shown below:

Column 1, line 58, "palletize" is changed to --palletized--.

Column 3, line 48: "entended" is changed to --extended--.

Column 10, line 31: "or" is changed to --of--.

Column 10, line 55: "22" is changed to --222--.

Column 11, line 30: "sigment" is changed to --segment--.

Column 14, line 26: "downwardly" is changed to --outwardly--.

Column 15, line 15: "secnd" is changed to --second--.

Signed and Sealed this

Thirteenth Day of November 1979

[SEAL]

Attest:

RUTH C. MASON
Attesting Officer

LUTRELLE F. PARKER
Acting Commissioner of Patents and Trademarks